United States Patent [19] | [11] 3,836,865
Koehler et al. | [45] Sept. 17, 1974

[54] PYROTECHNICALLY EXCITED LASER SYSTEM

[75] Inventors: Helmut A. Koehler, Livermore; David L. Redhead, Dublin; George A. Clough, Livermore, all of Calif.

[73] Assignee: The United States of America as represented by the United States Atomic Energy Commission, Washington, D.C.

[22] Filed: Jan. 10, 1973

[21] Appl. No.: 322,563

[52] U.S. Cl............... 331/94.5 P, 330/4.3, 149/42, 331/94.5 D
[51] Int. Cl.............................................. H01s 3/09
[58] Field of Search........ 331/94.5; 330/4.3; 149/42

[56] References Cited
UNITED STATES PATENTS
3,451,008  6/1969  Dunne.............................. 331/94.5

OTHER PUBLICATIONS
Smith et al., Picatinny Arsenal Tech. Report 3102, AD 420,238, August, 1963, pp. 1-29.

Primary Examiner—Ronald L. Wibert
Assistant Examiner—R. J. Webster
Attorney, Agent, or Firm—John A. Horan; Frederick A. Robertson; L. E. Carnahan

[57] ABSTRACT

A pyrotechnic means for optically pumping a lasing medium wherein a plurality of small, confined, pressed cylinders of a pyrotechnic mixture, e.g., 80/20 wt. % Hf/KClO$_4$, are ignited simultaneously to provide an energy fluence suitable for optically pumping an active (lasing) medium, e.g., Nd-Glass, Nd-YAG.

10 Claims, 7 Drawing Figures

PATENTED SEP 17 1974 3,836,865

PYROTECHNICALLY EXCITED LASER SYSTEM

BACKGROUND OF THE INVENTION

The invention described herein was made in the course of, or under, Contract No. W-7405-ENG-48 with the United States Atomic Energy Commission.

A need exists for a compact lightweight laser system capable of generating high intensity laser light pulses. In such systems, the intensity of the generated light pulse, among other factors, is primarily dependent on the energy fluence of the optical pumps exciting the active medium. Conventional optical pumping devices, e.g., flashlamps, cannot provide a sufficient energy fluence for producing high intensity laser pulses from the active medium in such lightweight compact systems.

It has been previously proposed to utilize exothermic pyrotechnic chemical reactions to release sufficient energy for optically pumping such laser systems. For example, reactions of metal-oxidizer compositions or pyrotechnic mixtures to generate very intense incandescent light suitable for optically exciting an active lasing medium are described in U.S. Pat. No. 3,271,696 issued Sept. 6, 1966 to J. DeMent, and an article "Pyrotechnically Excited Quasi Cw Laser," Soviet Physics-Technical Physics, Vol. 14, No. 3, Sep. 1969. However, such prior art phyrotechnic optical pumping fixtures and arrangements are inadequate to provide light fluences which can sufficiently excite active mediums above their lasing threshold for high intensity lasing.

SUMMARY OF THE INVENTION

The invention is a compact lightweight pyrotechnical optical pumping system, capable of producing high intensity laser light pulses from a lasing medium, which includes a number of pyrotechnic material firing assemblies for simultaneously igniting a plurality of small, confined, pressed cylinders of a pyrotechnic mixture to provide light energy fluences sufficient for obtaining high degree population inversions in lasing media.

The invention distinguishes broadly from the prior known pyrotechnically pumped laser systems in that the pyrotechnic material mixture is confined at high dynamic pressures. In addition, the inventive laser system utilizes a combustion chamber configuration and firing assemblies which provide a substantial advance in the state of the art.

Therefore, it is the object of this invention to provide a pyrotechnically excited laser system.

A further object of the invention is to provide a pyrotechnic means for optically pumping a laser medium.

Another object of the invention is to provide a compact light-weight, pyrotechnical optical pumping system, capable of generating high intensity laser light pulses from a lasing medium.

Another object of the invention is to provide a pyrotechnically excited laser system wherein the pyrotechnic material nixture is confined at high dynamic pressures.

Another object of the invention is to provide a pyrotechnically excited laser system wherein a plurality of small, confined, pressed cylinders of a pyrotechnic mixture, such as $Hf/KClO_4$, are ignited simultaneously for optically pumping a lasing medium, such as Nd-Glass or Nd—YAG.

Other objects of the invention, not specifically set forth above, will become readily apparent from the following description and accompanying drawings.

DESCRIPTION OF THE INVENTION

As pointed out above, the invention is a compact lightweight, pyrotechnical optical pumping system, capable of generating high intensity laser light pulses from a lasing medium, which includes a number of pyrotechnic (fuel-oxidizer) material (PTM) firing assemblies for simultaneously igniting a plurality of small, confined, pressed cylinders of a pyrotechnic mixture to provide light energy fluences sufficient for obtaining high degree population inversions in lasing mediums.

Figure 1:
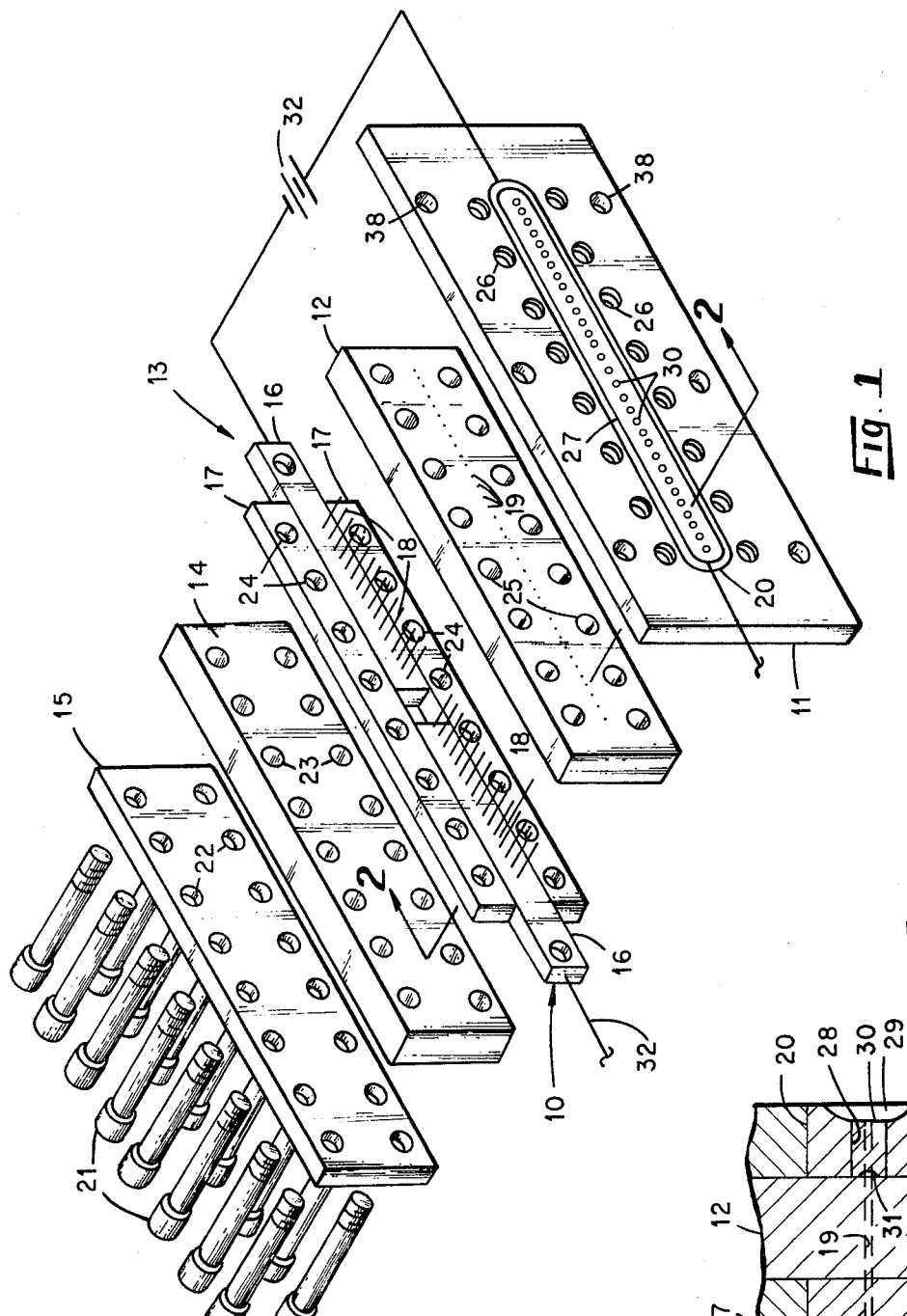
FIG. 1 is an exploded view of a firing assembly made in accordance with the invention.
Figure 2:
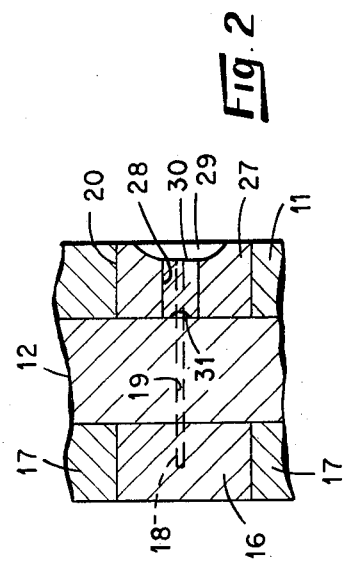
FIG. 2 is an assemblied partial cross-sectional view taken along the lines 2—2 of components of FIG. 1.

In more detail, with reference to FIGS. 1 and 2, the PTM firing assemblies, each being generally indicated at 10 (see FIG. 3), and each comprising a retainer member or plate 11, an insulator plate or member 12, a pin assembly or plate generally indicated at 13, an insulator plate or member 14, and a reinforcement plate or member 15. Pin assembly or plate 13 is composed of a pair of conductive mounts or members 16 positioned intermediate a pair of insulators 17, conductive members 16 each containing a plurality of individual firing pins 18 positioned to extend through small holes or apertures 19 in insulator plate 12 and into a channel 20 in retainer plate 11 when the components of assembly 10 are secured together such as by bolts 21 which pass through apertures 22 in reinforcement plate 15, apertures 23 in insulator plate 14, apertures 24 in insulators 17 of plate 13, apertures 25 in insulator plate 12, and are threadedly secured to retainer plate 11 via threaded apertures 26 therein. Channel 20 of retainer plate 11 contains a conductive member 27, such as steel, through which is drilled a linear row of cylindrical holes or apertures 28. Member 27 is additionally provided with a slight counterbored portion defining a cavity 29. A pyrotechnic (fuel/oxidizer) mixture (PTM) 30 such as 80/20 wt. percent of hafnium/potassium perchlorate ($Hf/KClO_4$) is pressed at about 20,000 psi into each of the cylindrical holes 28. The ends of firing pins 18 are flush with the surface of the pressed PTM, and thus flush with the interior surface of cavity 29. Member 27 is also provided on the side opposite cavity 29 with a small channel or cavity 31 which is also filled with PTM. A capacitor discharge circuit, indicated generally at 32 is connected between each of the conductive pin mounts or members 16 of pin assembly plate 13 and the steel member 27 of retainer plate 11 for igniting the PTM.

Figure 3:
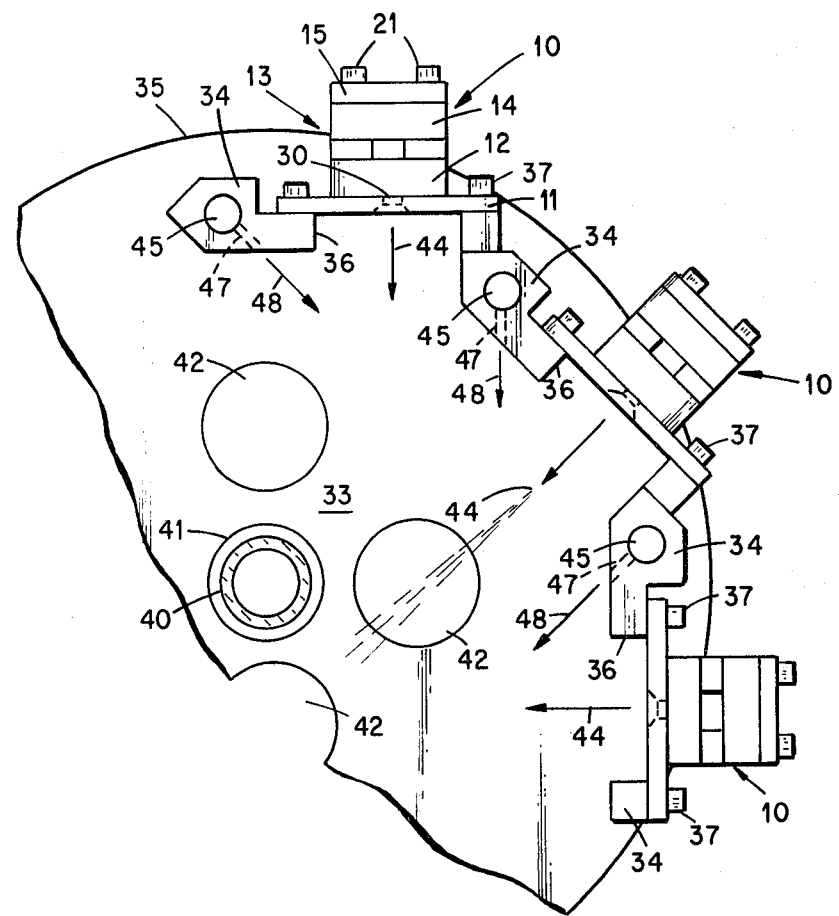
FIG. 3 is a partial view of a circular combustion chamber in accordance with the invention.
Figure 4:
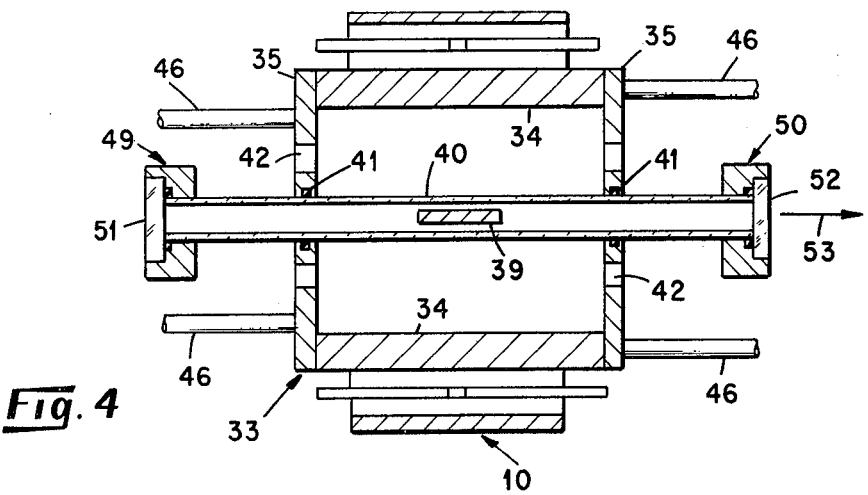
FIG. 4 is a longitudinal cross-sectional view of an embodiment of the inventive laser system.

With reference to FIGS. 3 and 4, a cylindrical combustion chamber 33 is formed by a plurality of support members 34 secured at each end thereof to a cover or end plate 35 (see FIG. 4), the support members 34 being constructed and positioned so as to define a plurality or openings or cylinders 36 on which are secured firing assemblies 10 (only three being shown). The firing assemblies 10 are secured to support members 34 via bolts 37 which pass through apertures 38 in retainer plate 11 and are threadedly attached in threaded holes in the support members 34. A cylindrical rod 39 of active (lasing) material, such as Nd-doped lasing materials including ND-Glass or Nd—YAG, is positioned at the center of chamber 33 within a suitable tube such as pyrex tube 40 which extends through cover plates 35 and is sealed therein by rubber seals 41 (see FIG. 4). Each of cover plates 35 are provided with pressure relief holes or openings 42 (four being utilized in this embodiment with only three being shown). The firing assemblies 10 are oriented with respect to the center of chamber 33 such that flame propagation, indicated at 44, from each assembly is directed tangentially away from, rather than toward, the center of the combustion chamber so that the flame does not directly impinge upon pyrex tube 40. Support members 34 are each provided with an internal passage or opening 45 connected via conduits 46 to an oxidizing gas supply, such as oxygen ($O_2$). Passageways or openings 47 connect openings 45 of support members 34 with the interior of chamber 33, whereby jets, indicated at 48, of pressurized oxygen gas are directed tangentially into the chamber. Pyrex tube 40 is provided at each end thereof with closure members generally indicated at 49 and 50, members 49 and 50 including windows 51 and 52, respectively, made of material such as sapphire, through which the laser light output or beam 53 passes.

In operation, the capacitor circuit 32 is discharged across the steel plate 27 and conductive mounts 16 of each PTM firing assembly 10 to simultaneously ignite the pyrotechnic mixture 30 at the top of the respective cylindrical holes 28 of each opening or cylinder 36. The PTM 28 explosively combines with the PTM in the small channel 31 of plate 27, further compressing the unreacted PTM within the cylindrical holes 28. Such compression further intensifies the light fluence from the reacting PTM. More specifically, the confinement of the PTM converts a normal deflagration reaction process into a detonation reaction process, which effectively shortens the duration of the light pulse emitted from the reacting mixture. The confinement also greatly increases the "brightness temperature" of the reacting PTM, i.e., delays "cooling" due to expansion.

As the PTM reactions proceed, a portion of unreacted mixture components will explosively propagate as indicated at 44 into the combustion chamber 33, forming an intensely luminous flame. Because of the orientation of the PTM assemblies 10 and the simultaneity of firing, flame propagation from the PTM assemblies swirls around the central pyrex tube 40 without depositing a substantial quantity of material on the tube 40 without depositing a substantial quantity of material on the tube surface which would cut-off the pump fluence prematurely. Pressurized oxygen, directed tangentially by jets 48 into the chamber 33 before and during firing of the assemblies 10, enhances the swirling motion of the luminous flame and speeds the reaction of the unreacted components of the PTM, to further increase the light fluence from the cloud of reactants.

Figure 5:
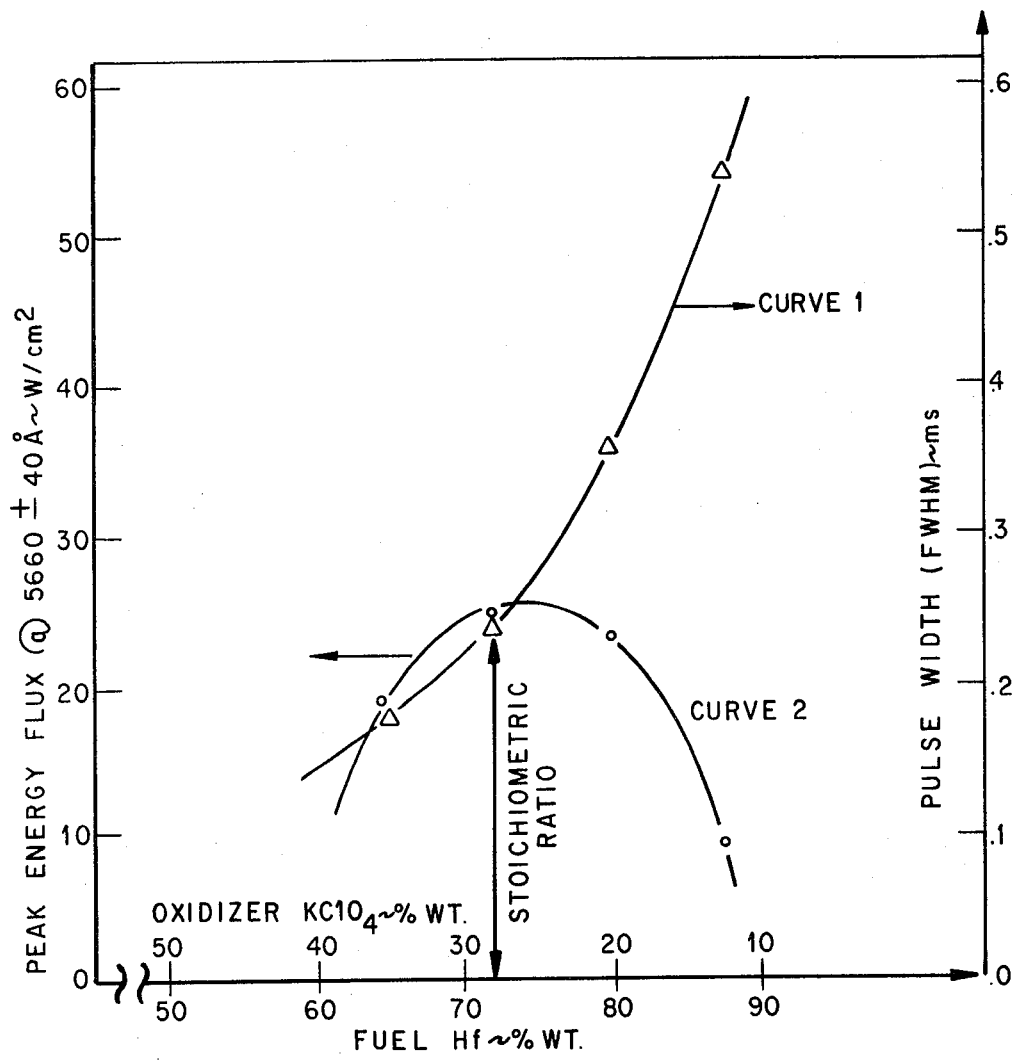
FIG. 5 is a graphic showing of the pulsewidth of the light flash from $Hf/KClO_4$ as a function of the percentage weight composition of the mixture, and the peak energy flux as a function of the percentage composition of the mixture.

FIG. 5 graphically shows, at curve 1, the pulsewidth of the light flash from Hf/KClO$_4$ (fuel/oxidizer) as a function of the percentage weight composition of the mixture. Also shown in FIG. 5, at curve 2, is the peak energy flux, for example, at 5660 ± 40 A in watts/cm as a function of the percentage composition of the PTM. The tests illustrated by curves 1 and 2 being conducted on a mixture ratio of Hf/KClO$_4$ over a range of about 60/40 to about 90/10 with a ratio in the range of about 70/30 to 80/20 producing the highest peak energy with a pulse width of about 0.25 ms. Tests were conducted with 2 × 25 mg confined cylinders pressed at ≈ 20,000 psi.

Figure 6:
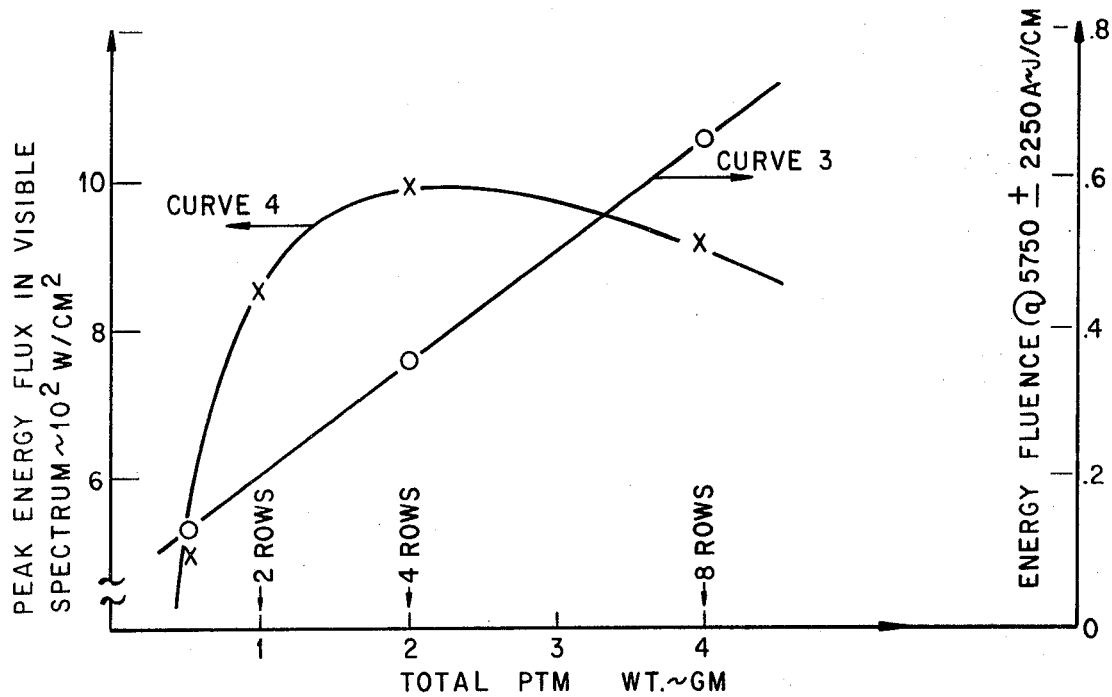
FIG. 6 is a graph showing the energy fluence and peak energy flux generated in a specified chamber across the visible spectrum as a function of the total mixture weight in grams.

FIG. 6 graphically illustrates the energy fluence at curve 3 and peak energy flux at curve 4 generated by Hf/KClO$_4$ in a 12 cm diameter circular combustion chamber across the visible spectrum as a function of the total PTM weight in grams. Energy fluence is defined as the product of the peak energy flux and the pulse width of the generated light flash. The PTM utilized in the test illustrated in FIG. 6 constituted: 3–25 $\mu$Hf, 3.5 $\mu$KClO$_4$ (80/20 percent wt Hf/KClO$_4$), O$_2$ gas added. The energy fluence was determined to be 150 m Joule at 5,750 ± 2,250 A per gram Hf/KClO$_4$.

Figure 7:
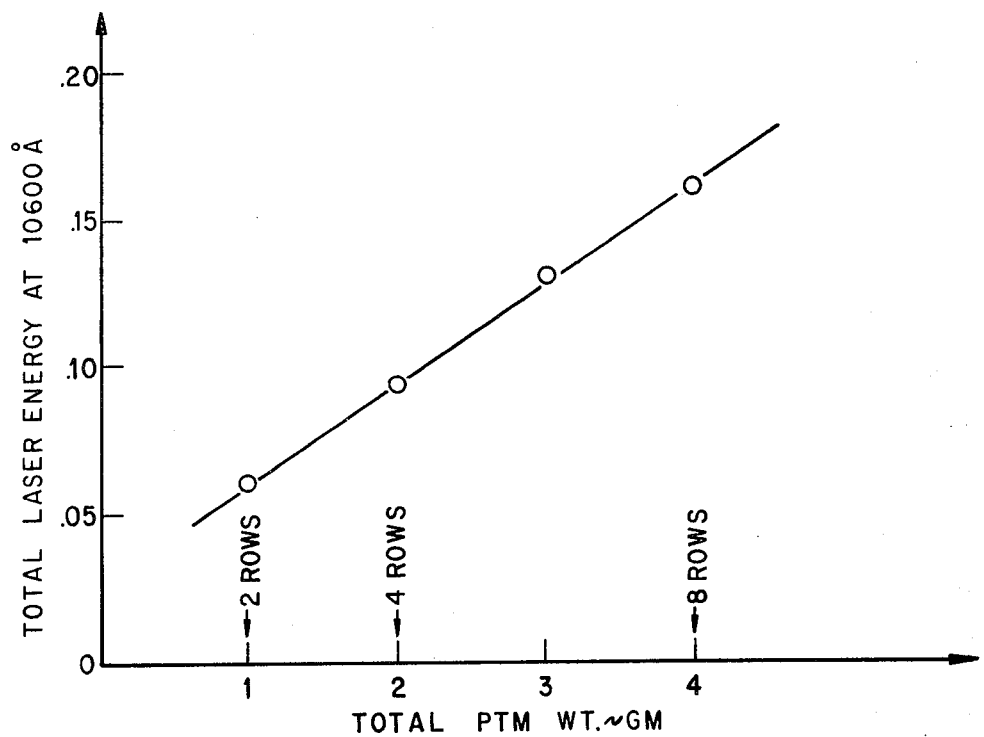
FIG. 7 is a graphic showing of laser energy vs. pyrotechnic material weight.

FIG. 7 graphically shows laser energy vs PTM weight in a 12 cm diameter cylindrical pyrotechnic laser utilizing a 1 inch × 3/16 inch diameter Nd—YAG (99–70) percent active (lasing) medium. The tests showed 32 milli-joule laser energy at 10,600 A per gram of 80/20 — percent wt Hf/KClO$_4$.

It has thus been shown that the present invention provides a pyrotechnically excited laser system which is highly compact, lightweight, and simply constructed capable of generating high intensity laser pulses. In summary, the invented laser system provides for: (1) a simultaneous burn of a plurality of individually ignited, confined, pressed cylinders of a pyrotechnic mixture; (2) a uniform and continuous distribution of the flame resulting from the ignited PTM around an active (lasing) medium; (3) optimal coupling of the pumping radiation from the PTM to the active medium; and (4) confinement of the PTM reactant products. Thus, the invention provides a laser system capable of a great variety of uses.

While a particular embodiment of the invention has been illustrated and described, modifications will become apparent to those skilled in the art, and it is intended to cover in the appendeed claim all such modifications as come within the spirit and scope of the invention.

What we claim is:

1. A pyrotechnically excited laser system comprising: means defining a combustion chamber, a lasing medium, means positioned within said combustion chamber and extending longitudinally therethrough containing said lasing medium, a plurality of firing assembly means operatively mounted on said combustion chamber defining means and positioned circumferentially and peripherally thereabout, means for substantially simultaneously activating said plurality of firing assembly means, means for supplying an oxidizing gas to said combustion chamber for enhancing swirling motion of flame produced by said plurality of firing assembly means and for speeding reaction of unreacted components therefrom, and means operatively connected with said lasing medium containing means for directing an output light beam therefrom, each of said plurality of firing assembly means containing a plurality of confined, pressed quantities of a pyrotechnic mixture and being constructed to direct flame propagation therefrom into said combustion chamber, whereby activation of said activating means ignites said pyrotechnic mixture producing an energy fluence from said flame suitable for optically pumping said lasing medium.

2. The laser system defined in claim 1, wherein said lasing medium is selected from Nd-doped lasing materials including Nd-glass and Nd—YAG.

3. The laser system defined in claim 1, wherein said laser medium containing means comprises pyrex tube means.

4. The laser system defined in claim 3, wherein said output light beam directing means includes reflector means positioned at each end of said pyrex tube means, and window means positioned at an opposite end of said tube means, whereby said light beam is passed through said window means.

5. The laser system defined in claim 1, wherein said combustion chamber defining means comprises a pair of spaced end plate means interconnected by a plurality of spaced support members, said plurality of firing assembly means being mounted in spaced relationship about said combustion chamber and secured intermediate associated pairs of said support members such that said flame propagation therefrom is directed tangentially away from said laser medium containing means.

6. The laser system defined in claim 5, wherein said oxidizing gas supply means includes openings in each of said support members adapted to be connected to an associated oxidizing gas supply for directing jets of pressurized oxidizing gas tangentially into said combustion chamber with respect to said lasing medium.

7. The laser system defined in claim 6, wherein said laser medium containing means comprises a pyrex tube means supported by said end plate means, and wherein said lasing medium comprises a rod-like means composed of material selected from the group of Nd-glass and Nd—YAG.

8. The laser system defined in claim 1, wherein said pyrotechnic mixture is composed of Hf and $KClO_4$ in the ratio of about 60/40 to about 90/10 percent wt.

9. The laser system defined in claim 1, wherein said plurality of firing assembly means each comprises a retainer plate means, a pin plate means, a reinforcement plate means, insulator means positioned intermediate said pin plate means and each of said retainer and reinforcement plate means, said pin plate means including at least one electrically conductive member provided with a plurality of firing pins, said retainer plate means having at least a portion thereof electrically conductive, said electrically conductive portion of said retainer plate means being provided with a plurality of openings therethrough into which said firing pin of said pins plate means extend, said plurality of quantities of pyrotechnic mixture being confined by and pressed into said plurality of openings in said retainer plate means and about said firing pins, and means for securing together each of said plate means and said insulator means.

10. The laser system defined in claim 9, wherein said conductive portion of said retainer plate means is provided on a side opposite said pin plate means with a longitudinal cavity, said quantities of pyrotechnic mixture and said firing pins terminating substantially flush with the surface of said cavity, and wherein said conductive portion of said retainer plate means is provided on a side adjacent said pin plate means with a longitudinal channel, said channel being substantially filled with a pyrotechnic mixture.

* * * * *